United States Patent [19]

DeLuca et al.

[11] Patent Number: 4,879,758

[45] Date of Patent: Nov. 7, 1989

[54] COMMUNICATION RECEIVER SYSTEM HAVING A DECODER OPERATING AT VARIABLE FREQUENCIES

[75] Inventors: Michael J. DeLuca, Boca Raton; Jeffrey B. Reed, Lake Worth, both of Fla.

[73] Assignee: Motorola, Inc., Schaumburg, Ill.

[21] Appl. No.: 276

[22] Filed: Jan. 2, 1987

[51] Int. Cl.⁴ .............................................. H04B 1/10
[52] U.S. Cl. .................................. 455/296; 455/310; 455/317; 455/186
[58] Field of Search ............... 455/343, 298, 299, 296, 455/127, 226, 310, 183–186, 165, 166, 207–209, 314–317; 340/825.44, 825.41; 331/2, 18, 22

[56] References Cited

U.S. PATENT DOCUMENTS

| | | | |
|---|---|---|---|
| 4,416,017 | 11/1983 | Jasper et al. | 455/296 |
| 4,512,035 | 4/1985 | Victor et al. | |
| 4,516,078 | 5/1985 | Yanagihara et al. | 455/296 |
| 4,541,118 | 9/1985 | Eastmond | 455/228 |
| 4,545,072 | 10/1985 | Skutta et al. | |
| 4,551,856 | 11/1985 | Victor et al. | |
| 4,606,076 | 8/1986 | Davis | |
| 4,631,496 | 12/1986 | Boras et al. | 455/343 |
| 4,661,995 | 4/1987 | Kashiwaga | 455/317 |
| 4,673,892 | 6/1987 | Miyashita et al. | 455/343 |

OTHER PUBLICATIONS

"Receiver Noise Figure Sensitivity and Dynamic Range—What the Numbers Mean," Hewlett Packard, Oct. 1975, pp. 8–25.

Primary Examiner—Benedict V. Safourek
Assistant Examiner—Curtis Kuntz
Attorney, Agent, or Firm—Michael J. DeLuca; Vincent B. Ingrassia

[57] ABSTRACT

A paging receiver and a method for minimizing spurious interference signals in the radio frequency (RF) stages and the intermediate frequency (IF) stages. The paging receiver includes a receiving means, a timing means, a voltage converting means, and a decoding means. A frequency for the timing signals generated by the timing means is selected to minimize spurious signal response. The timing signals are simultaneously applied to the decoding means and the voltage converting means. The frequency of the timing signal can be varied to minimize spurious signal response. The decoding means is notified of the timing signal frequency to effect the detecting and decoding of received coded information in real time.

27 Claims, 12 Drawing Sheets

TIME TO EXECUTE BACKGROUND TASK

FORGROUND PROCESS

TIMER VALUE TABLE

| TIMER INTERVAL | F1 TABLE F1= 2.000 MHZ | F2 TABLE F2= 2.016 MHZ | F3 TABLE F3= 2.032 MHZ | F4 TABLE F4= 2.048 MHZ |
|---|---|---|---|---|
| 77.5 ms | 19,375 | 19,530 | 19,685 | 19,840 |
| 5.0 ms | 1,250 | 1,260 | 1,270 | 1,280 |
| 2.5 ms | 625 | 630 | 635 | 640 |
| 1.0 ms | 250 | 252 | 254 | 256 |

VALUE = (Fn * TIME INTERVAL)/8

VALUE = NUMBER ADDED TO TIMER CAPTURE VALUE FOR NEXT TIMER INTERVAL

Fn = MICROPROCESSOR CLOCK FREQUENCY

8 = PREDETERMINED CONSTANT PARTICULAR TO MICROPROCESSOR

TIME INTERVAL = AMOUNT OF DESIRED TIME BETWEEN PREVIOUS TIMER INTERRUPT AND NEXT TIMER INTERRUPT

*FIG.12*

DECODING MEANS CLOCK FREQUENCY DETERMINATION
SINGLE RECEIVE FREQUENCY—
SINGLE DECODING MEANS FREQUENCY

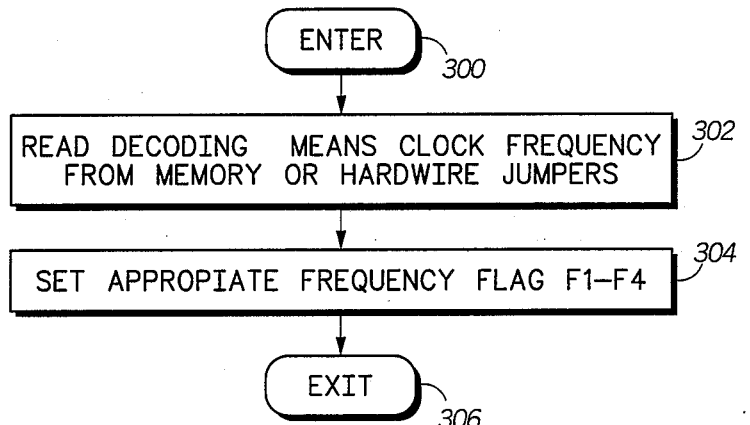

*FIG.13*

COMMUNICATION RECEIVER SYSTEM HAVING A DECODER OPERATING AT VARIABLE FREQUENCIES

BACKGROUND OF THE INVENTION

1. Field of the Invention

The present invention relates to communication receivers and more particularly to a method and apparatus for minimizing spurious interference signals generated in a communication receiver.

2. Background Discussion

Communications systems in general and paging systems in particular using selective call signalling have attained widespread use for calling a selected paging system receiver by transmitting information from a base station transmitter to the paging receiver. Modern paging receivers have achieved multifunction capability through the use of microprocessors which allow the paging receiver to respond to information having various combinations of tone, tone and voice, or data messages. This information is transmitted using any number of paging coding schemes and message formats.

Numerous problems are associated with communications receivers in general and radio frequency (RF) paging receivers in particular in designing a receiver which can operate over a wide range of receive frequencies. Typically, paging receivers operate over a range from 35 MHz to 900 MHz. One of the problems associated with paging receivers is spurious interference signals, also known as self-quieting spurious response, which greatly affects receiver noise and sensitivity.

The receiver self-quieting phenomenon is caused by fundamental and harmonics of the receiver local oscillators either being at a frequency that the receiver is capable of responding to as though it were an incoming or intermediate frequency signal, or mixing together in any non-linear stages of the receiver to produce a frequency which the receiver is capable of responding to as though it were an intermediate frequency signal. These local oscillators can be of three types.

The first type of local oscillator is used to produce an intermediate frequency in the intermediate frequency stage of a communication receiver. The oscillator typically drives a frequency synthesizer capable of generating any one of a number of predetermined injection signal frequencies. In general, for every intermediate frequency, there is a local oscillator.

The second type of oscillator is found on receivers with digital circuitry. This oscillator is used to clock the digital circuitry which decodes data that has been modulated onto the incoming RF signal. The digital circuitry such as a microprocessor decodes the demodulated data in real time and uses this second type of local oscillator to establish an internal time base for decoding and processing the paging information.

The third type of local oscillator is typically an RC type oscillator used to perform various support functions for the paging receiver. There may be several of the third type local oscillators in the receiver. The support functions include a frequency base for a DC-DC converter, a frequency base for driving a multiplexed liquid crystal display, or an interval timer used has a watch dog or deadman timer for the microprocessor.

The receiver self-quieting phenomenon is perhaps best understood by first examining the phenomenon as a conventional dual conversion super heterodyne receiver such as the one shown in FIG. 1. In this system, an RF frequency input $F_{rf}$ first enter input 10 of the receiver's RF stages 12. These RF stages 12 may include amplification, matching, filtering networks, etc. as required by the system. In general, substantially the same RF frequency $F_{rf}$ will exit an output 14 of RF stages 12 and enter an input 16 of a first mixer 18.

A first local oscillator frequency $F_{LO1}$ is produced by a first local oscillator 20 having an output 22 operatively coupled to a second input 24 of first mixer 18. Oscillator 20 may be a conventional crystal controlled oscillator whose frequency is determined by a crystal 26. This oscillator crystal may be one of many such crystals which may be selectively coupled to oscillator 20 in order to provide the user with a plurality of receiver channels. Alternatively, oscillator 20 may be a frequency synthesizer which may generate and number of frequencies via frequency synthesis in order to provide the user with a plurality of receiver channels.

As is well known in the art, first mixer 18 will produce an output intermediate frequency $F_{IF1}$ on output terminal 28 in accordance with the equation $F_{IF1} = F_{RF} - F_{LO1}$ if the system uses low side injection to the first mixer or $F_{IF1} = F_{LO1} - F_{RF}$ if the system utilizes high side injection at first mixer 18.

The first intermediate frequency $F_{IF1}$ is applied to an input 30 of first IF stages 34. First IF stages 34 may include amplifiers and filters for processing the intermediate frequency signal $F_{IF1}$ as necessary. In the preferred embodiment, first IF stages 34 includes a narrowband crystal filter.

An output 32 of the first IF stages 34 is operatively coupled to an input 36 of a second mixer 38 thereby applying $F_{IF1}$ thereto. A second local oscillator 40 provides a second local oscillator frequency $F_{LO2}$ at an output 42 to be applied to an input 44 of second mixer 38. Oscillator 40 is generally a fixed frequency oscillator having frequency $F_{LO2}$ determined by a single oscillator crystal 46.

A second intermediate frequency appears at an output 48 of mixer 38 and has frequency designated $F_{IF2}$. The second local oscillator frequency $F_{LO2}$ is determined in accordance with the equation $F_{IF2} = F_{IF1} - F_{LO2}$ if low side injection is utilized for the second mixer and $F_{IF2} = F_{LO2} - F_{IF1}$ if high side injection is utilized for the second mixer.

This second IF frequency $F_{IF2}$ is applied to an input 50 of second IF stages 5 where the signal is further processed and appears at an output 54 of the second IF stages. At this point, the signal is further processed by other circuitry as deemed necessary in accordance with the systems specifications and requirements. Most frequently, output 54 will drive a demodulator such as a frequency modulation (FM) discriminator.

It is often the case that the second IF stages 52 are utilized to obtain large quantities of gain at the second IF frequency $F_{IF2}$. It is typical for second IF stages 52 to include amplifiers having gains in excess of 120 dB. Since the second IF frequency $F_{IF2}$ is the lowest intermediate frequency in a dual conversion receiver system, it is most economical and advantageous to utilize the second IF stages 52 to obtain the majority of the system gain and selectivity.

As was stated earlier, the receiver self-quieting phenomenon is caused by fundamental and harmonics of any of the receiver's local oscillators either being at frequency that the receiver is capable of responding to as though it were an incoming signal, $F_{RF}$, or intermediate frequency signal, $F_{IF1}$ or $F_{IF2}$, or mixing together in any non-linear stages of the receiver to produce a frequency which the receiver is capable of responding to as though it were an intermediate frequency signal, $F_{IF1}$ or $F_{IF2}$. When oscillator frequencies that satisfy the self-quieting criterion are inadvertently selected, the result is the presence of a signal in the receiver which causes the receiver to respond as though it is receiving an incoming signal. In an FM system, this can result in the receiver "capturing" itself while ignoring an incoming signal. This condition is known as receiver self-quieting. It is important to note, however, that this phenomenon occurs totally independent of any input external signal at frequency $F_{RF}$. In a receiver with four local oscillators; two for the first type, $F_{101}$ and $F_{102}$, which are used for mixing and producing intermediate frequencies, one of the second type, $F_{clk}$, which establishes a time base for digital decoding circuitry; and one of the third type, $F_{dcdc}$, which is the frequency for a DC-DC converter, the receiver will respond as though it is receiving an incoming radio frequency signal if any of the following equations are satisfied:

$$F_{rf} = I^*F_{101} \text{ or } J^*F_{102} \text{ or } K^*F_{clk} \text{ or } M^*F_{dcdc}$$

or $$F_{if1} = (I^*F_{101}) + (J^*F_{102}) + (K^*F_{clk}) + (M^*F_{dcdc})$$

or $$F_{if2} = (I^*F_{101}) + (J^*F_{102}) + (KF_{clk}) + (M^*F_{dcdc})$$

where I, J, K, and M are integers. It can be appreciated that there are numerous combinations of frequencies that may be a problem to the receiver system designer. If only the first ten harmonics of the above frequencies are considered, there are 184,461 frequency combinations to consider. The combinations that result in self-quieting are limited to the products that fall within the bandwidth of the communication receiver, typically 25 KHz to 50 KHz for a paging receiver. For example, a combination resulting in a frequency of $F_{rf}$ +/−25 KHz, or $F_{if1}$ +−25 KHz, or $F_{if2}$ +/−25 KHz can result in a self-quieting spur with a 50 KHz bandwidth paging receiver.

The spurious signals generated by the first type of oscillator have been alleviated somewhat by driving the IF stages at multiples of the same frequency as disclosed by Victor in U.S. Pat. No. 4,551,856. However, complications increase for designing a receiver system capable of receiving a incoming frequency ranging from 35 MHz to 900 MHz. While no one receiver circuit may be capable of receiving over this range, a normal receiver with RF and IF circuit modifications may be required to receive over this frequency range. Also, while the accuracy of the first and second type oscillators can be confined to a range of less than +/−50 parts per million, the accuracy of the third type oscillator, such as the type in a DC-DC converter, even when accurately trimmed such as shown in U.S. Pat. No. 4,606,076, are not much more accurate than 72,000 parts per million over the operating environment of the receiver. To complicate matters further, more self-quieting spurious combinations are possible with another third oscillator type and third intermediate frequency and additional support circuit RC oscillators. Referring briefly to FIG. 4, there is a power spectra shown of the spurious interference caused by these oscillators in a multifunction paging receiver. As is evident, numerous spurious interference signals are generated by these type of oscillators.

Over the 35 MHz to 900 MHz incoming signal frequency range, several intermediate frequencies may be selected to design the receiver, depending upon the particular range of the incoming frequency. However, the clock frequency ($F_{clk}$) for the digital decoder is held constant because the modulated data on the incoming signal is held at a fixed data rate. The clock frequency $F_{clk}$ may be trimmed over a very narrow frequency range in an attempt to remove spurious interference signals, however, changes in the clock frequency may cause the improper decoding of incoming data because of improper synchronization of the decoder to the incoming signal data rate. Inaccurate timing results in loss of data and can result in inoperation of the paging receiver. The DC-to-DC converter frequency is also typically fixed to optimize the efficiency of the conversion or to prevent harmonic radiation directly into an intermediate frequency stage.

In general, the final or last intermediate frequency is also held constant because of availability of common ceramic filtering devices. The system designer then attempts to optimize higher intermediate frequencies (if additional intermediate frequencies are required) and high side or low side injection techniques to minimize a self-quieting spur combination. This is typically done by selecting spur combinations where the spurs are the result of higher harmonics of the local oscillators. This is done because the energy in the harmonics decreases rapidly with increasing harmonics. If a self-quieting spur exists with the typically fixed final intermediate frequency stage and the fixed clock oscillator and DC-to-DC converter frequencies, considerable engineering effort is focused upon decoupling the decoder oscillator and DC-to-DC converters from the intermediate frequency section. This is often difficult in small portable receivers because of the close physical proximity of the circuitry.

The spurious interference signals created by the second and third type of oscillators are transported to the intermediate frequency stage by two mechanisms. The two mechanisms which cause coupling of the decoder clock and DC-DC converter clocks to the intermediate frequency stages are conduction and radiation interference. One skilled in the art will readily appreciate that even a very small signal level conducted along power supply lines or ground lines when amplified in the final intermediate frequency stage can severely interfere with proper operation of the receiver. Also, signals electromagnetically radiated onto the signal lines or inductive elements of the intermediate stages can severely interfere with the proper operation of the receiver. The coupling is typically reduced by improving bypassing of stages, changing power and ground current flows and shielding sensitive components from radiation. This process of reducing this coupling is typically an expensive and a time consuming part of the product development cycle.

After these problems are solved for the intermediate frequency, they must again (if necessary) be solved for each incoming frequency a pager is to operate on over the 35 MHz to 900 MHz range. This means solving these problems again for each new intermediate frequency and each new first local oscillator. This adds more time to the product development cycle and increases the cost of the product's development.

SUMMARY OF THE INVENTION

The present invention has been developed for the purpose of alleviating the above mentioned problems of the prior ar paging receivers. Accordingly, the invention has as one of its objects an apparatus and method for minimizing spurious interference signals generated in a pager receiving system.

Another object of the present invention is to operate a decoding means of the paging receiver at a selected oscillator frequency for minimizing spurious signals while maintaining proper timing for effectively detecting and decoding received paging information in real time.

It is another object of the present invention to provide a method for storing a plurality of oscillator frequencies in a storage means and providing the oscillator frequencies to the microprocessor of the decoding means corresponding to the operating frequency of the microprocessor.

It is a further object of the present invention for providing a microprocessor implemented process defining a plurality of tasks wherein the microprocessor is operated at a selected oscillator frequency for minimizing spurious signals while maintaining the task timing for effecting the decoding and processing of the paging information.

In general, a communication receiver for receiving coded information includes at least one predetermined intermediate frequency comprises a receiving means, a decoding means, a voltage converting means, and a timing means. The receiving means receives the coded information. The decoding means detects and decodes the received coded information. The voltage converting means coupled to the decoding means provide power to the coding means. The timing means is coupled to the decoding means and voltage converting means for controlling the operating frequency of the voltage converting means and the decoding means such that spurious interference signals interfering with the intermediate frequency signals are minimized while maintaining a decoding means timing for effecting a detection and decoding of the received coded information.

In particular, in one form of the invention, the timing means includes an oscillator for generating a series of base timing signals and a frequency translation means for generating a first timing signal for the decoder means and a second timing signal for the voltage converting means, the first and second timing signal frequencies being harmonically related to the base timing signal frequency are harmonically unrelated to the frequency of the intermediate frequency signal or the receiving signal.

In another form of the invention, the decoding means includes a microprocessor having a memory means. The timing means is adapted for operating at a plurality of selectable base frequencies corresponding to a plurality of received signal frequencies. The memory means includes stored values corresponding to the plurality of frequencies of the timing means. The memory means provides a stored value corresponding to the operating frequency of the timing means to the microprocessor. The microprocessor uses the stored values for effectively detecting and decoding the received coded information in real time while operating at any on of the plurality of selectable base frequencies.

In general, the method of the present invention minimizes spurious interference signals generated in a communication receiver system for receiving coded information, the communication receiver having at least one predetermined intermediate frequency and including a receiving means, a timing means, a voltage converting means, and a decoding means. The method selects a frequency for timing signals generated by the timing means, the frequency being selected to minimize spurious signals in the intermediate frequency signal or receiving signal of the communication receiver. Synchronized timing signals from the timing means are simultaneously applied to the decoding means and the voltage converting means, thus minimizing spurious signals. The coded information is received at the receiving means. The decoding means detects and decodes the received coded information in real time while operating at a harmonic of the timing signals from the timing means.

Other features and advantages of the present invention will become apparent from the following detailed description, taken in conjunction with the accompanying drawings, which illustrate, by way of example, principals of the invention.

BRIEF DESCRIPTION OF THE DRAWINGS

FIG. 12 is a table showing a plurality of frequencies and the corresponding bit counts for the timer intervals for the foreground task.

FIG. 13 is a block diagram illustrating the decoder clock frequency routine for determining the base frequency of the timing means;

DETAILED DESCRIPTION OF AN ILLUSTRATED EMBODIMENT

I. General Description

Figure 1:
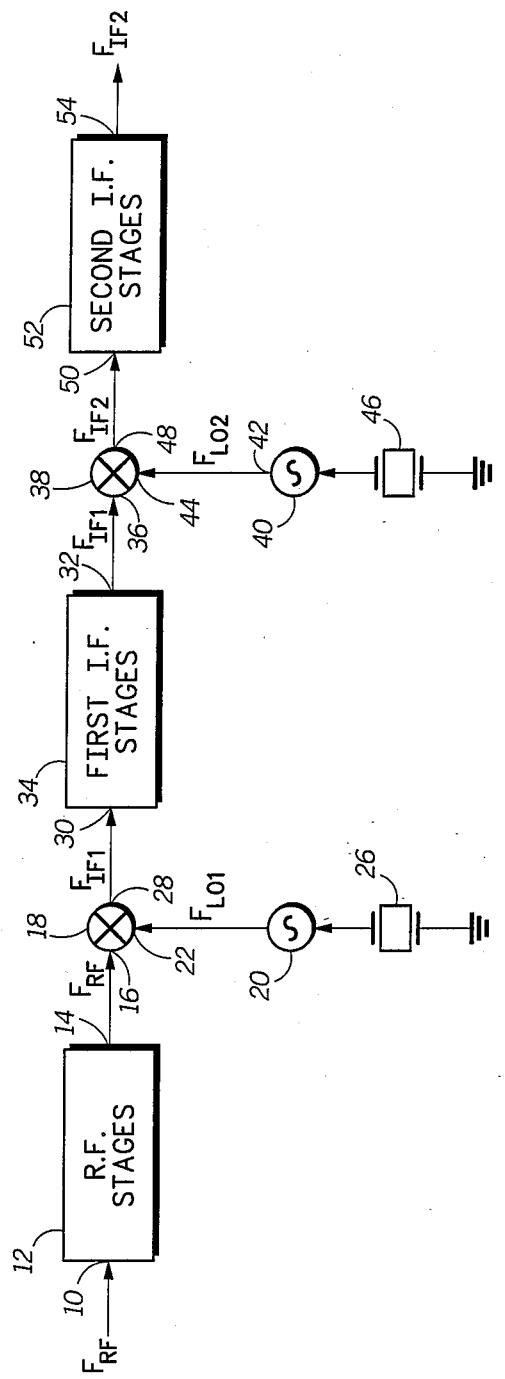
FIG. 1 is a block diagram of a prior art conventional dual conversion super heterodyne receiver for illustrating receiver self-quieting spurious interference signals.

In order to best illustrate the utility of the present invention, it is described in conjunction with a communication receiver such as a paging receiver capable of receiving and decoding encoded information. While the present invention is described hereinafter with particular reference to a paging receiver, it is to be understood at the outset of the description which follows, it is contemplated that apparatus and methods, in accordance with the present invention, may be used with numerous other communication transceivers.

The paging receiver described herein is associated with a paging system having a base station terminal, response to coded data information from the base station terminal, and in turn, stores, alerts, and provides data messages to a user during operation. With reference to the drawings in general, there is illustrated a paging receiver 100 and a method for minimizing spurious interference signals generated by interaction between second type oscillator such as a microprocessor clock and a third type of oscillator such as a DC-to-DC converter clock.

The method in one form of the present invention includes a method for minimizing the spurious signals in a paging receiver by operating the microprocessor and DC-to-DC converter from a single oscillator to provide a mixing of the timing signal between the DC-to-DC converter and the microprocessor equal to the harmonics of a single clock oscillator, thus minimizing spurious response. In another form of the invention, a variable oscillator provides base timing signals to the microprocessor while the microprocessor maintains a real time detecting and decoding function of incoming paging information. This is accomplished by defining a plurality of tasks for the microprocessor to perform for effectively detecting, decoding, and processing paging information. The plurality of tasks are divided into two or more groups corresponding to an incoming signal processing group (foreground process) and a received signal processing group (background process). The foreground process is executed on a real time basis at a predetermined frequency according to the paging scheme. The microprocessor determines the base timing signal frequency and modifies the foreground processing frequency. The background process is executed on a time available execution priority. During operation, the foreground process may interrupt the background process to schedule and execute foreground tasks.

Typical foreground tasks include detecting the incoming paging information, synchronizing the incoming paging information for decoding the paging information, and storing the paging information in a buffer or memory. Typical background tasks include reading the paging information stored in the buffer or memory, generating an alert according to the paging information and manipulating the paging information according to commands entered by the user. These commands may include requests for displaying the paging information, deleting the paging information, and protecting the paging information.

II. Paging Receiver

Figure 2:
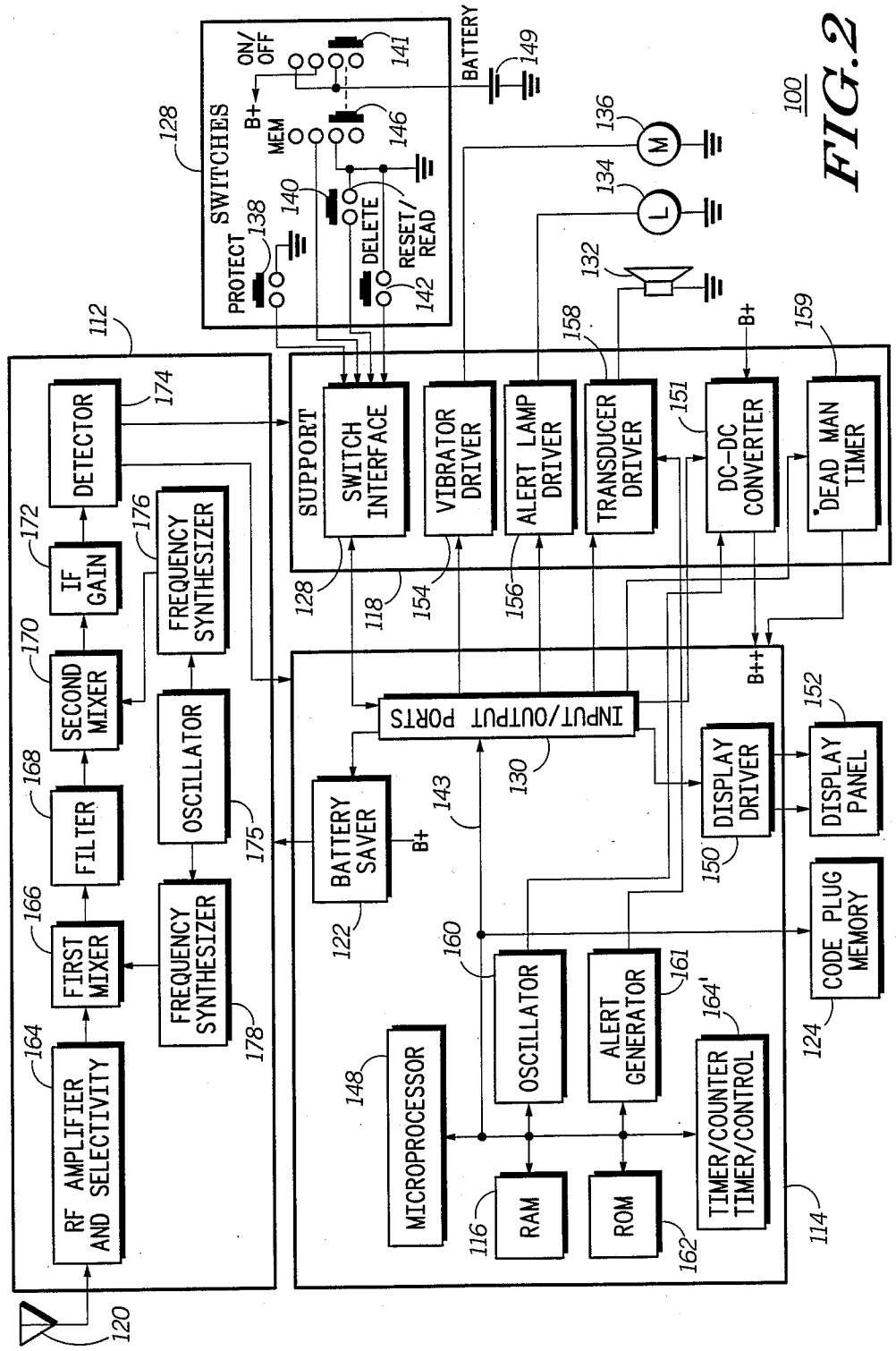
FIG. 2 is a detailed block diagram of a typical paging receiver embodying the present invention.

More particularly and with specific reference to FIG. 2, there is shown a paging receiver 100 of the present invention including a receiving means 112, a decoding and controlling means 114, a memory means 116, a support means 118, a switching means 128, and an annunciating means 132-136.

In FIG. 2, an antenna 120 receives information such as paging information. The antenna 120 is coupled to receiving means 112 that is subject to the control of decoding means 114. The decoding means 114 includes a microprocessor 148 that not only controls receiving means 112, but may also operate receiving means 112 on an intermediate basis to extend the life of a voltage generating means 149 such as batteries through battery saver circuit 122. Receiving means 112 outputs to decoding means 114 which has an address decoder for comparing receive address words with an address contained in a code plug memory 124 for determining if the paging receiver has been activated and for preventing the paging receiver 100 from functioning if it has not been activated.

Basically, the code plug memory 124 is operatively coupled to the decoding means 114 such that when receiving means 112 receives paging codes and corresponding selective calling signals, the decoding means 114 actuates the code plug memory 124 and reads a unique coded contents thereof. If the receive paging code matches the unique paging code from code plug memory 124, then the selective calling message associated with the receive paging code is stored in memory means 116. It is important to note that decoding means 114 must operate to decode in real time paging information transmitted in a known paging scheme. That is, the timing of the decoding means is critical to decode received information. Inaccurate timing results in loss of data and can result in malfunction of the paging receiver.

Paging receiver of FIG. 2 has the capability of storing selective calling message signals in memory 116 for providing them to support means 118 or display driver 150 for read out according to the state in which the switches of switching means 128 are set. A switch interface 126 provides input capability for switching means 128 to microprocessor 148. More specifically, the switching means 128 includes switches 140 and 146 for passing signals to the microprocessor to control the alert annunciators 132, 134, and 136; switches 138, 140 and 142 to control the storage protection and retrieval of messages stored in memory 116; and on-off switch 141. Switch 146 allows the user to select one of several of the alert modes which typically comprise light emitting diodes 134, speakers 132, vibrators 136, or other annunciators.

Controlling and decoding means 114 includes microprocessor 148. Microprocessor 148 decodes the address data in a known fashion and compares the results with the predetermined address contained in code plug memory 124 to produce output signals to process the message data, to store the message data, and to generate an alert that a message has been received. Microprocessor 148 communicates through bus 143 with other elements of the paging receiver by way of input/output ports 130. One of the output signals from the microprocessor 148 is applied to a display driver 150 to produce an alphanumeric display of data on the display panel 152. Other output signals are supplied to a support module 118 to selectively enable the vibrator driver 154, alert lamp driver 156, or a transducer driver 158. Other signals are applied to battery saving unit 122 and switch interface 126. Microprocessor 148 also controls an alert generator 161 which causes tones produced by transducer driver 158 to be applied to speaker 132.

A clock signal as derived from an oscillator 160 is applied to microprocessor 148, such as an MC146805L6 microprocessor manufactured by Motorola, Inc., to control the rate at which the incoming paging information signals is detected, decoded, and processed. It is understood that microprocessor 148 uses oscillator 160 for controlling internal operations as well as interfacing with other elements of the paging receiver 100 such as timer counter 164. Timer counter 164 provides microprocessor 148 time interrupt information and includes the necessary hardware for effecting timing operations. Attention is directed to FIGS. 8-14 for a detailed discussion of the timing control of microcomputer 148. The microprocessor 148 is coupled by a data bus 143 to a read only memory (ROM) 162 and by data bus 143 to a random access memory (RAM) 116. RAM 116 is adapted to store paging information messages which microprocessor 148 converts from received encoded paging information signals and processes these signals including decoding and appropriately store the messages in designated memory location areas of RAM 116. The programs or routines to operate microprocessor 148 are stored in ROM 162 and are explained generally with respect to FIGS. 8-13. Microprocessor 148 is coupled to DC to DC converter 151 and to code plug memory 124. Microprocessor 148 is also shown interconnected with a deadman timer 159. A voltage generating means such as a battery 149 is shown coupled to DC-to-DC converter 151 for supplying power to the controlling and decoding means 114. It is to be understood that paging receiver 100 may operate on voltage generating means 149 only. However, in practice, an additional battery is necessary for providing the higher voltages required to operate microprocessor 148. The DC-to-DC converter 151 eliminates the need for an additional battery by electronically providing a higher voltage than battery 149 can provide.

The DC-to-DC converter 151, also responsive to the controlling and decoding means 114, comprises energy conservation means. When paging information is decoded, it identifies a decoding scheme which specifies those periods during which power may not be required to determine if the paging receiver has been addressed. Such times are established by the organization of the message scheme transmission format. Moreover, the DC-to-DC converter 151 provides any additional voltage necessary to operate the controlling and decoding means at higher voltage levels to support the high speed real time operation of the microprocessor 148.

The DC-to-DC converter 151 supplies power to memories 116, 162, and 124 and is responsive to microprocessor 148. Again, according to the determined coding scheme, at various times appropriate for the message formatting the decoded coding format, DC-to-DC converter 151 may reduce the power supplied to the system thereby conserving the battery energy. Deadman timer 159 functions to insure that there are no runaway execution conditions. In particular, microprocessor 148 is designed to provide a signal to a deadman timer 159 on regular intervals. In the event that the deadman timer 159 does not receive the signals at regular intervals due to a run away execution condition in the microprocessor, it forces a reinitialization of the program routines included in ROM 162 to cause initialization of the microprocessor.

Referring to FIG. 2, there is also shown a detailed block diagram of elements of receiving means 112. The antenna 120 is connected to a radio frequency amplifier and selectivity device 164 which is connected to a first mixer 166. A first frequency 178 is also connected to first mixer 166. The output of first mixer 166 is coupled through filter 168 to a second mixer 170. A second frequency 176 is also connected to second mixer 170. The output of second mixer 170 is connected through an intermediate frequency (IF) gain device 178 to a detector 174. An oscillator 175 drives frequency synthesizer 178 and 176 to minimize spurious response from the receiving means 112.

The output of detector 174 is connected to controlling and decoding means 114. The output of detector 174 is also connected to annunciation transducer 132 via support module 118. This connection is a normal connection for tone and voice paging systems. Battery 149 is shown as providing power to the communication receiver via battery saver 122. Battery saver 122 is also coupled to microprocessor 148 to preserve and extend the useful life of the battery by controlling the power supply to receiving means 112.

It is noted that the description of the pager operation given above is general in nature. More details of the pager operation are found in U.S. Pat. No. 4,518,961 entitled "Universal Paging Device with Power Conservation" assigned to the present assignee which disclosure is hereby incorporated by reference.

To repeat, the paging receiver 100 recovers signals transmitted over a communication channel and supplies a signal to decoding means 114 which includes the microprocessor 148. Microprocessor 148 decodes the recovered signal by determining if it contains a data pattern equivalent to one of the one or more signal patterns stored in code plug memory 124. If a pattern match is detected, the microprocessor 148 activates an annunciator transducer and causes an appropriate alert to be generated to inform the user that a paging signal has been received.

In order to minimize the drain from the battery 149, the microprocessor is operated in two modes: a fully operational mode being a high power drain and a reduced computational mode being a reduced power drain. The fully operational mode is used to decode signals in real time and the reduced computational mode is employed during the interval to the next transition of a fully operational mode. To take full advantage of the power saving, dual mode operation of the microprocessor, the DC-to-DC converter power 151 has two operational states that correspond to the two modes in the microprocessor. That is, the DC-to-DC converter has a high output state which can supply power required to operate the decoder in a high power drain mode and a reduced output state in which it can supply the power required to operate decoder in its low power drain mode.

III. DC-to-DC Converter

Figure 3:
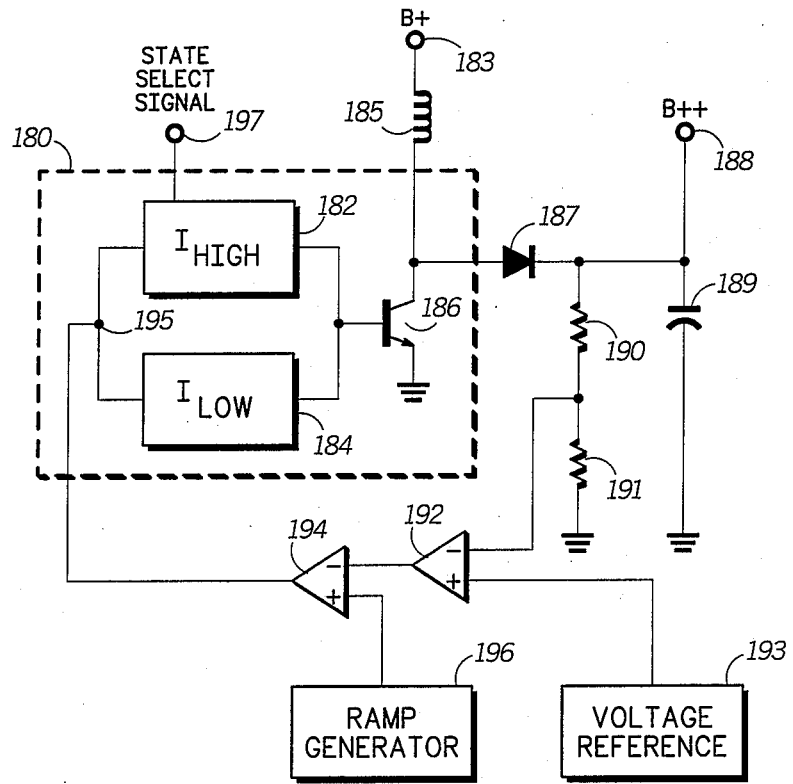
FIG. 3 is a detailed electrical diagram of a voltage converting means such as a DC-to-DC converter.

The diagram in FIG. 3 shows the basic elements for the DC-to-DC converter 151 in FIG. 2. Briefly, a coil driver circuit 180 shown enclosed by broken lines includes high and low circuit sources 182 and 184 connected to the base of the switching transistor 186. Transistor 186 has its emitter connected to ground and its collector connected to enable a coil 185 to be energized by a B+ supply terminal 183 from battery 149, which may be a 1.3 volt cell. The coil driver circuit 180 is also coupled to the anode of the diode 187. A B++ output terminal 188 is connected to the cathode of diode 187 and to the load circuitry (not shown). The output voltage at terminal 188 is the required multiple of the B+ voltage from battery 149. A capacitor 189 is coupled between B++ supply 188 and ground to help provide a filtering function. The B++ supply 188 is also coupled to a divider circuit comprising series resistors 190 and 191. The divide down voltage at the interconnection between resistors 190 and 191 is coupled to a negative input of an error amplifier 192. A reference voltage source 193 is connected to the positive input terminal of amplifier 192. The error amplifier 192 compares the divide down voltage with a reference voltage from voltage reference source 193, amplifies the difference and couples this error voltage to the positive input terminal of the comparator 194. It will be apparent that changing the reference voltage 193 will, within limits, change the B++ voltage. A ramp generator 196 is connected to the negative input terminal of comparator 48. The ramp generator 196 provides a saw tooth signal at a predetermined frequency. It is important to note that applicants have discovered that ramp generator 196 also is a source of spurious response in the intermediate frequency. The comparator 194 switches at a point on the ramp or saw tooth signal determined by the error signal from the amplifier 192.

The output of comparator 194 is coupled to the coil driver 180 via terminal 195 and is a pulse width modulated signal in which the width of the pulse is determined by how closely the voltage level matches the desired output level. Also coupled to the coil driver circuit 180 is a state select signal from a state select signal input terminal 197. This signal selectively actuates high current source 182 to control the magnitude of current available for energizing the coil 185 and thus the power state of DC-to-DC converter 151 in response to the mode of operation of the microprocessor. For a better understanding of the configuration of functional cooperation of the components of the DC-to-DC converter 51 described briefly above, attention is directed to U.S. Pat. No. 4,355,277 entitled "Dual Mode DC/DC Converter" which is assigned to the assignee of the present invention, the disclosure of which is hereby incorporated by reference.

Applicants have discovered that the frequency of the ramp generator 196 and the frequency of oscillator 160 which provides the timing for the microprocessor combined to produce spurious responses. These spurious responses include the fundamental frequencies respective harmonics and mixing products which are conducted or radiated into the intermediate frequency of receiving means 12. For example, applicants have found that spurious signals radiating from coil 185 or conducted from the circuit in FIG. 3 produce spurious response in the intermediate frequency. Also, the frequency of the voltage converter and the microprocessor can mix in non-linear stages of the receiver which produce spurious response in the intermediate frequency. Spurious response in the intermediate frequency causes degradation in the sensitivity of the paging receiver.

Figure 4:
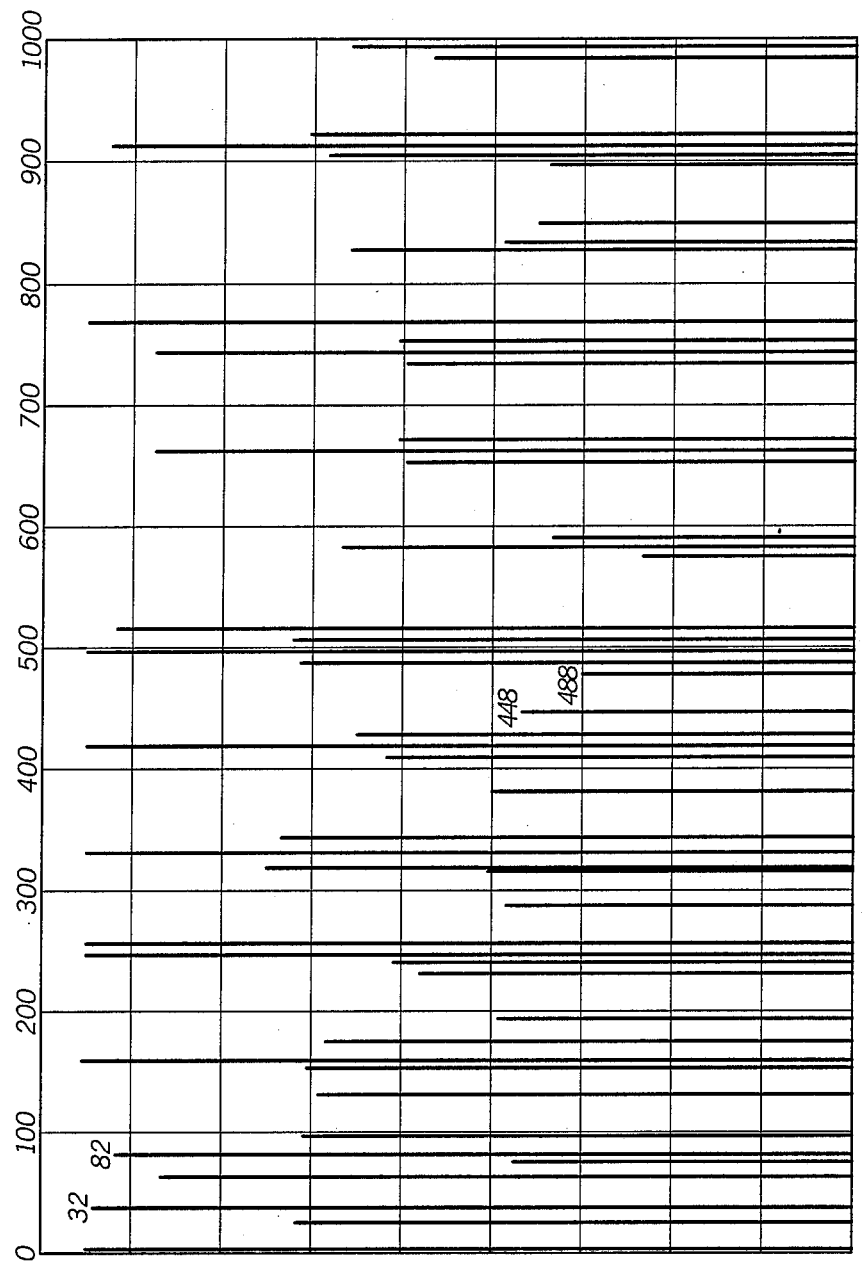
FIG. 4 is a graph of the power spectra showing the power associated with spurious interference signals generated in a paging receiver.

Referring to FIG. 4, there is shown a power spectra of the spurious signals generated by a DC-DC converter having a frequency of 82 KHz and a microprocessor oscillator having a frequency of 32 KHz. The mixing products are not necessarily shown in this power spectra. In addition to the spurious signals, an ever greater problem is the results of the spurious signals being in the bandpass of the filters of receiving means 112. For example, the spurious signals being in the pass band of the intermediate frequency 455 KHz to 465 KHz are the 14th harmonic of the 32 KHz decoder oscillator 448 KHz. Powerful mixing products not shown in FIG. 4 are the combination of $4*F_{clk}+4*F_{dcdc}=460$ KHz and $(-1)*F_{clk}+6*F_{dcdc}=466$ KHz. These signals result in a significant degradation in the operation of the paging receiver 100. As is evident, the power spectra of FIG. 4 discloses that a considerable amount of power is generated in the spurious frequencies produced between the second and third type of oscillators causing considerable noise in the paging receiver system.

Figure 5:
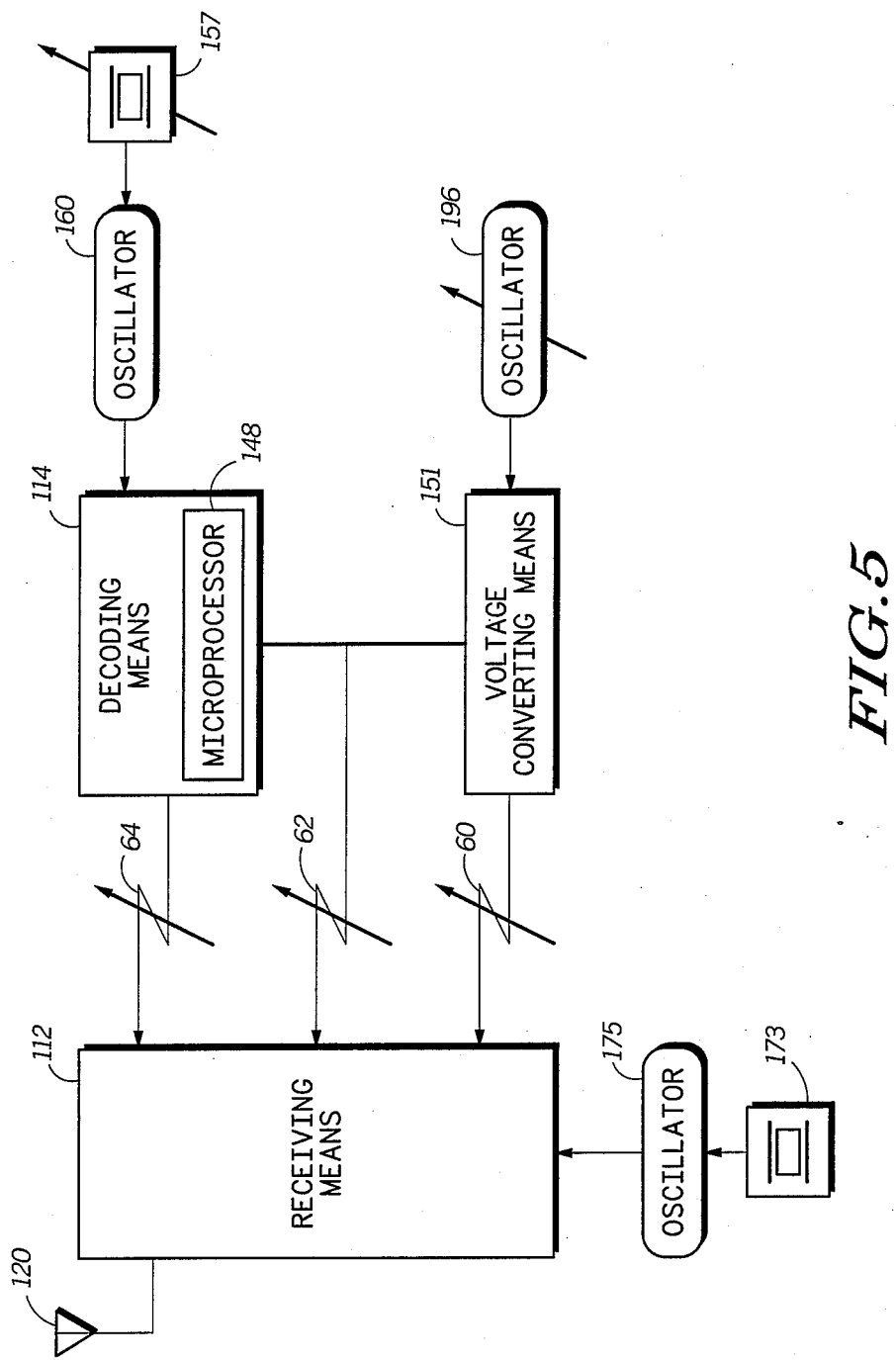
FIG. 5 is a block diagram conceptually showing the contribution of spurious interference signals caused by the two different types of oscillators in a paging receiver.
Figure 6:
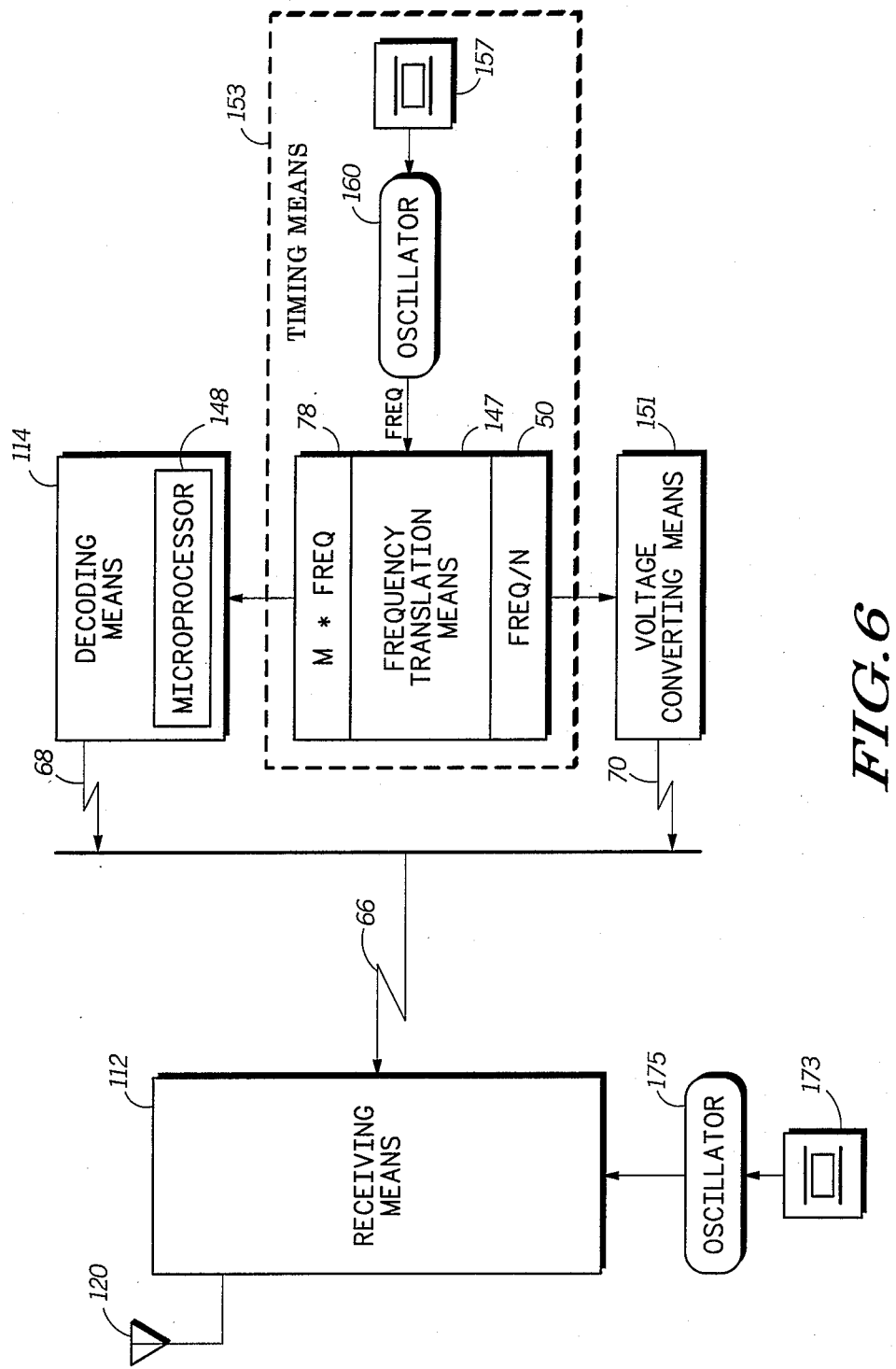
FIG. 6 is a block diagram of a paging receiver embodying the present invention and illustrates a decoding means and voltage converting means being driven by a single oscillator.
Figure 7:
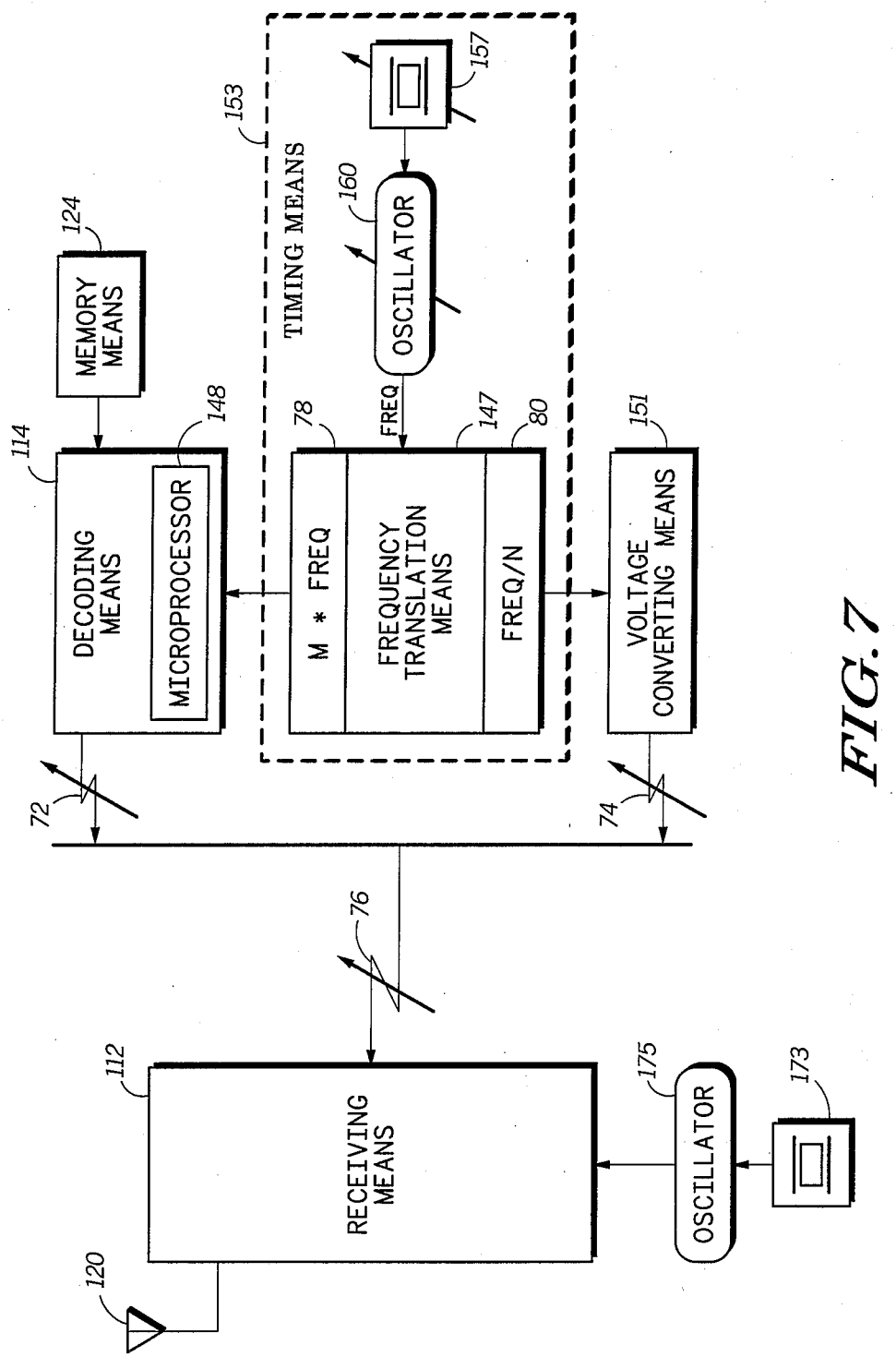
FIG. 7 is a paging receiver of the present invention illustrating the decoding means and voltage converting means being driven by an oscillator having a plurality of selectable base frequencies.

Having described in detail the operation of the various components of a paging receiver which generate spurious response in the receiving and intermediate frequencies, FIG. 5 shows conceptually the problems as discovered by Applicants generated by the first, second, and third oscillator. FIGS. 6 and 7 illustrate two embodiments of the present invention to solve the problems.

FIG. 5 shows conceptually the spurious signals generated by each type of oscillator being applied to receiving means 112 of paging receiver 100. Frequency 60 is caused by radiation and conduction being produced by oscillator 196 and oscillator 175 being driven by crystal 173 and picked up by receiving means 112. Oscillator 175 is driven by crystal 173 in a manner well known in the art. As previously described with reference to FIG. 3, the ramp generator 196 of the DC-to-DC converter can be trimmed over a very narrow frequency range in an attempt to minimize the spurious signals picked up by receiving means 112. Thus, by varying the oscillator frequency, the frequency 60 is varied. However, oscillator 196 can only be trimmed over a very narrow frequency.

Frequency 64 is produced by oscillator 160. Oscillator 160 is driven by crystal 57 in a manner well known in the art. Since oscillator 160 can be varied over a very small range of frequency, frequency 64 can be varied over a very narrow frequency range. However, note that the varying of oscillator 160 directly affects the timing of microprocessor 148 included in decoding means 114. If crystal 57 and thus oscillator 160 is varied outside the operating range of microprocessor 148, significant problems occur because microprocessor 148 is unable to decode received paging information in real time.

Frequency 62 is generated by the interaction o oscillator 196 and 160 in the non-linear stages of the receiver. Since oscillator 196 and 160 can be slightly varied, the frequency of 62 is also varied. Since frequency 62 depends upon the fundamental frequencies of 160 and 196 and their harmonic, the power levels of frequency spectrum of 62 are very hard to predict. Since the power levels are hard to predict, it is even further difficult to design the paging receiver to prevent the spurious interference signals. Thus, as is evident in FIG. 5, spurious signal frequencies can be produced by the different types of oscillators and detected by receiving means 112 which severely degrades the operation of paging receiver 100.

FIG. 6 is a block diagram showing one illustrated embodiment of a method for minimizing the spurious signals caused by the interaction between oscillator 196 and oscillator 160. A timing means 153 coupled to decoding means 114 and voltage converting means 151 provides synchronized timing signals to each of the decoding means 114 and voltage converting means 151. Timing means 153 includes crystal 157, oscillator 160, and frequency translating means 147. Crystal 157 drives oscillator 160 which provides basic timing signals to frequency translation means 147. Frequency translation means includes a first frequency, a diversity means 78, and a second frequency diversity means 50. The first frequency diversity means 78, such as a frequency synthesizer, generates a timing signal (M*Freq) to decoding means 114. The second frequency diversity means 50 generates timing signals (freq/N) for voltage converting means. Frequency synthesizers and dividers are well known in the art. Note that the frequencies 60, 62, and 64 of FIG. 5 are now replaced by a single frequency 66 which is produced by oscillator 160. Frequency 66 is a combination of frequency 68 from decoding means 114 and frequency 70 from voltage converting means 151. However, since voltage converting means 151 and decoding means 114 are driven by the same oscillator 160, frequency 70 and frequency 68 will be harmonics of the same frequency 66. By driving the voltage converting means 151 and the decoding means 114 with the same common oscillator 160, the frequencies 68 and 70 are now related by an integer times FREQ and all spurious signal products will equal the basic oscillator harmonic or subharmonics. Thus, the spurious signals are well defined (harmonics or subharmonics of frequency) and can be designed around. Note that since oscillator 160 is driven at a predetermined frequency, software for microprocessor 148 can be easily implemented since the basic timing signal frequency is fixed at a known frequency.

Applicants have also discovered that operating the microprocessor 148 at different frequencies can reduce even further the radiated and conducted spurious signals by shifting the spurious signals beyond the passband of the intermediate frequency filters. FIG. 7 shows an illustrated embodiment of varying the frequency of oscillator 160 for driving voltage converting means 151 and decoding means 114. The spurious signal 76 is comprised of well defined harmonics of frequencies 72 and 74. Varying oscillator 160 varies frequencies 72 and 74 which in turn vary signal 76. Since the spurious signal frequency 76 depends upon oscillator 160, varying oscillator 160 also varies the spurious signal frequency 76. Thus, the spurious signals can be selected so as not to interfere with the receiving means 112 operation. However, the microprocessor 148 must operate in real time to synchronize the detecting and decoding of incoming paging information. Since the microprocessor 148 is timer interrupt driven, frequency information regarding the frequency of oscillator 160 is provided to the microprocessor 148 through memory 124 or other such device so that the timer interval can be software adjusted for the frequency of the crystal 157 used.

Timing means 153 includes crystal 157, oscillator 160, and frequency translation means 147. Timer means 153 provides synchronized timing signals to voltage converting means 151 and microprocessor 148. The oscillator crystal may be one of many such crystals which may be selectively coupled to oscillator 160 in order to provide a plurality of base timing signal frequencies. Crystal 157 provides timing pulses to oscillator 160. Oscillator 160 provides timing signals (freq) to frequency translating means 147. Frequency translating means 147 includes frequency diversity means 78 such as a frequency synthesizer to convert the oscillator signal (freq) to a multiple frequency signal (M*freq) which is applied to microprocessor 148. Frequency translating means also includes frequency diversity means 80 such as a frequency divider to convert (freq) to a lower frequency (freq/N) which is applied to voltage converting means 151. Alternatively, frequency translation means may include a frequency synthesizer which may generate any number of frequencies via frequency synthesis to provide a plurality of base frequencies.

As is evident from FIG. 7, varying the crystal frequency 157 and thus the microprocessor timing signal causes the software for microprocessor 148 to operate at different crystal frequencies which may vary over a wide range of frequencies while effectively detecting and decoding incoming paging information. The microprocessor frequency can be selected so that the decoder spurious signals do not interfere with the paging receiver operation. The software for implementing this process is described in detail in FIGS. 8-14.

Referring to FIGS. 8-14, there are shown detailed flow charts describing the operation of microprocessor 148 at a plurality of oscillator base frequencies while maintaining the proper timing for data decoding. It is to be pointed out that the plurality of frequencies at which oscillator 160 are operated may vary over a wide range of frequencies which is not to be confused with the operation of the frequencies of oscillator 160 of FIG. 5. The frequencies of oscillator 160 of FIG. 5 vary in the range of +/−100 parts per million while the oscillator 160 of FIG. 7 may operate over a range of 100,000 parts per million.

IV. Software

1. General Description

The following flow charts refer to the operation of microprocessor 148. The programs are stored in ROM 162 in a predetermined sequence to cause the operation of microprocessor 148 for operating at different timing frequencies while maintaining a proper timing for data decoding according to the paging scheme used by the paging system. That is, the memory 162 stores a plurality of instructions defining a plurality of tasks. One such task detects and decodes, at a predetermined rate, paging information received at the receiving means. The microprocessor is operated from timing signals derived from a base timing signal generated by a crystal. In one form of the invention, the crystal frequencies are changed to minimize the spurious signals in the intermediate frequency. The microprocessor timing signals change accordingly. However, since the data rate on the incoming signal does not change, the decoding task must operate at a predetermined rate for effecting a decoding and processing of the paging information. Other routines for the operation of the paging receiver are included in the ROM, however, the routines are not described herein since they are not needed for the understanding of the present invention.

Figure 8:
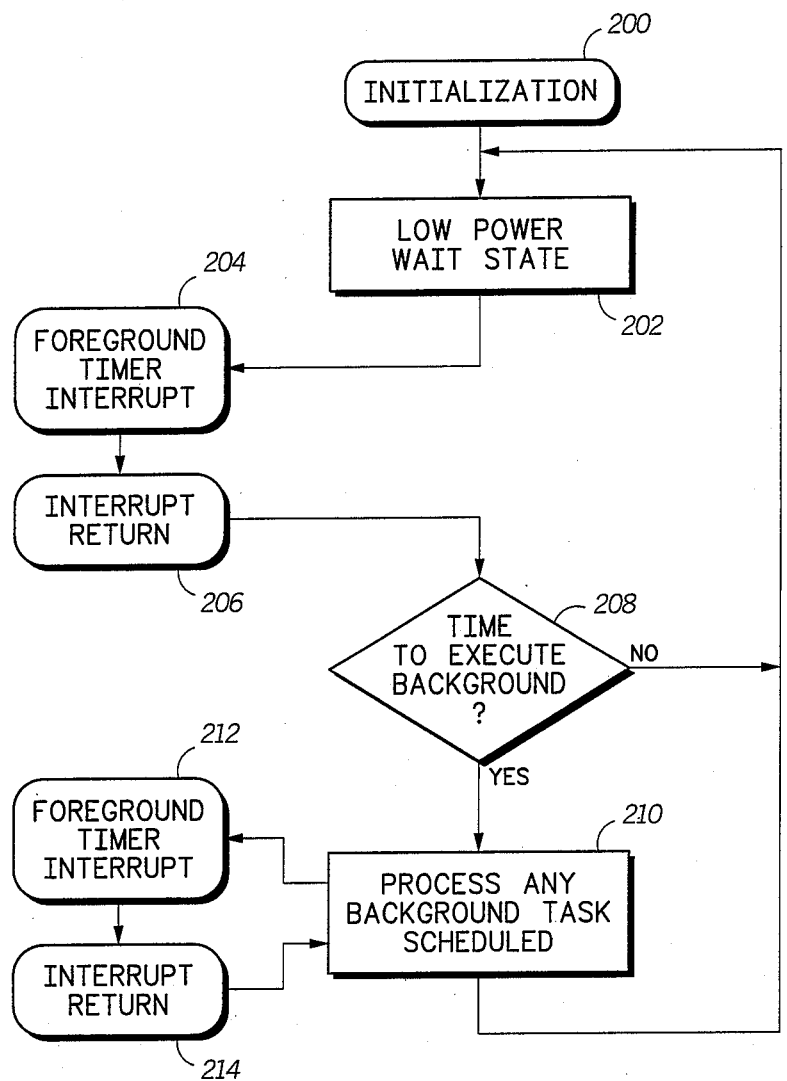
FIG. 8 is an overall flow chart of the background process of the present invention for a paging receiver of the present invention.

The present invention relates to a method for minimizing the spurious signals of a paging receiver. FIG. 8 illustrates the overall flow diagram for the decoding means of the paging receiver for decoding, displaying, and annunciating data messages included in paging information received by the paging receiver 10. The operating software of the decoding means separates into foreground and background processes. The foreground process includes foreground tasks for performing functions well known in the art such as decoding data from the receiver and battery saving operations. The foreground tasks are not described in detail since their exact operation is not needed for the understanding of the present invention. The background process illustrated in FIG. 8 includes those routines for operating the microprocessor at several crystal frequencies while maintaining the foreground task at a processing rate for effecting detecting and decoding of the paging information.

In general, the task processes of the microprocessor are divided into two or more groups corresponding to the foreground process or an incoming signal processing group and a background process such as a received signal processing group. The incoming signal processing group is executed on a real time basis for decoding the paging information according to a predetermined paging scheme. The received signal processing group is executed on a time available execution priority in which the incoming signal processing group receives a higher priority execution schedule. The received signal processing group are executed on a time available priority and are scheduled at least at a predetermined time interval such as 77.5 milliseconds for the illustrated embodiment. Specific received signal processing tasks are scheduled depending upon the interaction of the user with the received paging information. For instance, the user may desire to display paging information that has been stored in the memory of the microprocessor. To do this, the user would activate the read switch 140 which would schedule a background task to read the paging information and display the information on the display means. During the execution of the background process including the execution of the received signal processing tasks, the foreground process may be scheduled and executed. Upon this occurrence, the background process is interrupted and the foreground process, including the incoming signal processing group, is scheduled in response to the incoming paging information signal.

The foreground task being prioritized detects the incoming paging information, decodes the paging information, and stores the paging information in a memory buffer for background. The basic foreground process involves cycling through battery saving, synchronizing and decoding operations. When no signal is present, the foreground is in a battery save state of operation. At predetermined intervals, synchronization is attempted. If no signal is present, synchronization is not achieved within a predetermined interval and the foreground returns to battery saving operation. If a signal is present and synchronization is detected, the foreground performs data decoding functions. Data decoding functions may include a second type of battery saving and periodic synchronization in addition to data decoding. Data decoding functions continue for the duration of the data transmission. After processing the incoming signal processing group, the background processing group is rescheduled and executed.

Specifically and with reference to FIG. 8, initially, the microprocessor included in the decoding means is powered up and housekeeping techniques well known in the art are performed to initialize the registers and peripheral equipment connected to the microprocessor, step 200. The microprocessor then goes into a low power state, waiting for a foreground timer interrupt, step 202. The foreground process is able to operate on a plurality of base timing signals determined by a selectable clock frequency for minimizing spurious response. The foreground process performs real time processing of information received by the paging receiver. This real time processing includes such tasks as bit synchronization, data decoding, frame or group decoding, or battery saving. The foreground tasks detect, decode, and store the data in an appropriate manner for the background process to manipulate and display the data. The background process schedules manipulation and display tasks on a predetermined average interval, such as 77.5 milliseconds. It is important to note that the timing of the foreground tasks are dependent upon the particular paging scheme utilized in the paging system.

For example, bit synchronization under one particular paging scheme operates at a rate of 200 bps and requires 1.0 ms time intervals to complete bit synchronization. While the present invention is described hereinafter with particular reference to this paging scheme, it is to be understood at the outset of the description which follows that it is contemplated that the apparatus and methods in accordance with the present invention may be used with numerous other paging schemes having different timing requirements. These include, but are not limited to, the Golay Sequential Code and the British Post Office Paging System Format (POCSAG). In the low power waiting state, the microprocessor is on a reduced computational ability mode in which it merely times the interval to the next transition to the high power state. While the microprocessor is in the low power wait state 202, a variable foreground timer interrupt will occur, step 204. The foreground timer interrupt is generated at a precise, predetermined time by the microprocessor's internal timer. The precise interval is necessary for proper sampling of the incoming data. The time interval depends upon the foreground tasks scheduled and processed. For instance, in the paging scheme cited, a bit synchronization task window is set for 1.0 milliseconds, data decoding is set for 2.5 milliseconds, frame identification or group identification is set for 5.0 milliseconds, and battery saving is set for 77.5 milliseconds to complete the task.

When a foreground timer interrupt is detected, the microprocessor is vectored to a foreground time interval task to process the interrupt and schedule the foreground tasks. For a more detailed explanation of the foreground process, reference is made to FIG. 9. After the interrupt is processed and any foreground tasks are processed, the foreground process returns back to the background process via an interrupt return to determine if the background process is to be executed, step 206. The background process is executed by examining a background timer, step 208. The background timer counts (either up or down) and when a predetermined value is reached, a known time interval has elapsed. In the illustrated embodiment, when 77.5 milliseconds has elapsed and the background timer is equal to a predetermined value, such as zero, the background process is executed, step 210. If 77.5 milliseconds has not elapsed, the microprocessor is vectored back to a low power wait state, 202.

The background process 210 includes tasks such as switch detecting, manipulating data messages, displaying data messages, deleting data messages, and reading data messages. The background process is a multi-task process having tasks scheduled according to the functions required for the operation of the paging receiver. During the background process 210, the foreground timer may interrupt the background process and schedule foreground tasks required for processing incoming paging information, steps 212 and 214. After the background process 210 is completed, the background timer is initialized (set to zero) and the microprocessor is placed in the low power wait state, step 202.

Figure 9:
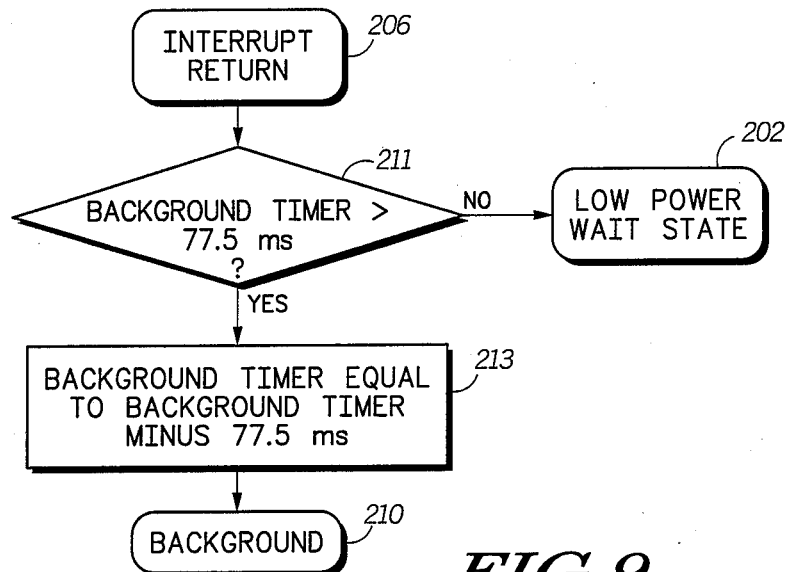
FIG. 9 is a flow chart of the time to execute task for a paging receiver of the present invention.

Referring to FIG. 9, there is shown a detailed flow chart of the time to execute task 208. Upon entry from the interrupt routine 206, the background timer is checked, step 211. If the background timer is less than 77.5 milliseconds, the system is returned to the low power wait state 202. If the background timer is greater than 77.5 milliseconds, the background timer is set equal to the background timer minus 77.5 milliseconds. Note that this step provides an effective average of 77.5 milliseconds for the low power wait state. For instance, if the background timer is 78.5 milliseconds at step 211, 1.0 milliseconds will be saved for the next lower powered wait state. The routine then proceeds to execute the background tasks, 210.

Figure 10:
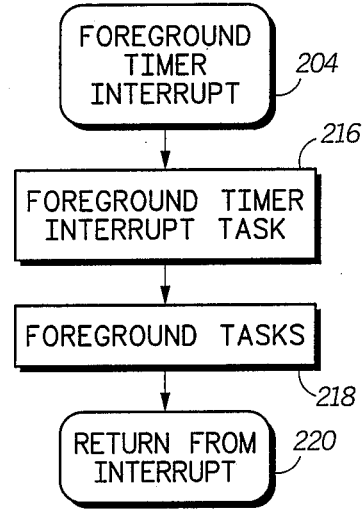
FIG. 10 is an overall flow chart of the foreground process of a paging receiver embodying the present invention.

Referring to FIG. 10, there is shown the overall foreground process flow. Upon a foreground timer interrupt 204 occurring, the foreground time interval task is scheduled, step 216. The foreground time interval task determines the base frequency of the operating decoder clock and schedules one of the foreground tasks, depending upon the processing of the incoming signal required, step 218. These tasks include the incoming signal processing group such as bit synchronization data decoding, address decoding, and power saving. After the incoming signals are processed, the foreground process returns to the background to execute the instruction after the instruction executed prior to the foreground timer interrupt, step 220.

Figure 11:
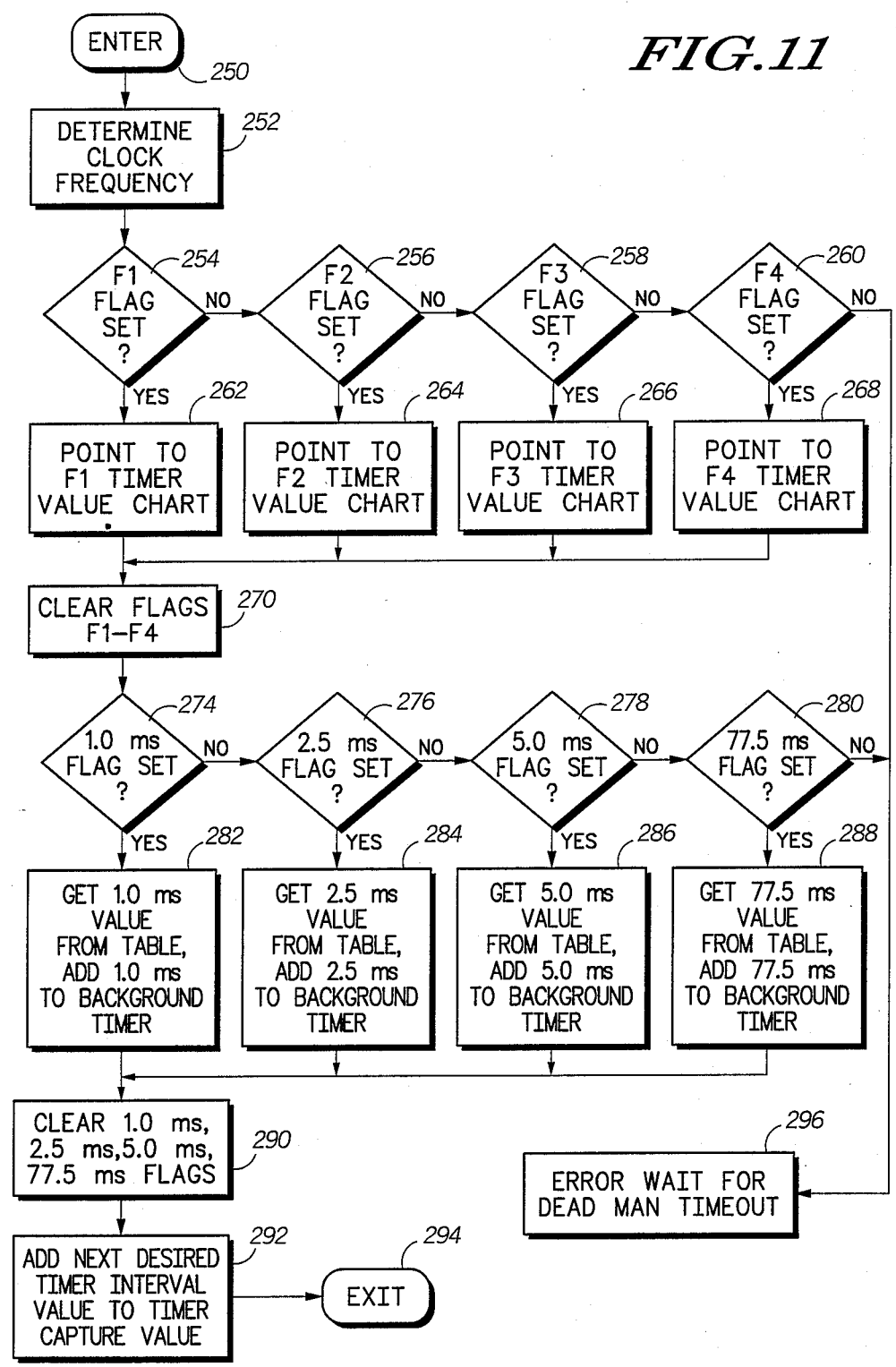
FIG. 11 is a detailed flow chart of the foreground timer interrupt interval task illustrating the plurality of timing intervals associated with a plurality of tasks in the foreground process.

Referring to FIG. 11, there is shown a detailed flow chart for the foreground timer interval task. The task is entered upon an interrupt generated by the foreground timer. The foreground timer is an internal timer to the microprocessor. Upon entering the foreground timer interval task, the routine first determines the clock frequency for the microprocessor, step 252. For a more detailed discussion of the microprocessor clock task, reference is made to FIGS. 13-14.

After determining the microprocessor clock frequency, one of a plurality of flags will be set to indicate the clock coupled to the microprocessor. In the illustrated embodiment, four flags represent four different frequencies available for the microprocessor. It is to be understood, however, that other clock frequencies are available by appropriately connecting the microprocessor to the corresponding clock. Steps 254 through 260 determine which flag has been set by the clock frequency task 252. A flag is set, a pointer is adjusted to point to a timer value table which contain constants for determining timing intervals based upon the frequency represented by the respective flag. Steps 262 through 268 adjust the pointer to corresponding predetermined values for generating timing values based upon the corresponding flag being set. After the pointer is adjusted to the appropriate timer value constants, the task clears the clock frequency flags, step 270.

It is important to note that step 270 allows the microprocessor to operate on a plurality of base clock frequencies and to switch the base frequency during operation. Since the flags are cleared every time the foreground timer interrupt task is entered, the clock frequency can be changed dynamically during the operation of the paging receiver and the foreground timer interval task will appropriately adjust the resulting foreground and background timer values respectively.

To repeat briefly, a plurality of base timing signal frequencies are established to minimize spurious signals in the IF. These timing signal frequencies are easily established because the IF signal operating frequency, the RF frequency and the spurious signal frequency are known. Each timing signal frequency corresponds to a received frequency signal to minimize the spurious signals for that frequency. These frequencies are stored in a memory or other device so that the microprocessor can determine the operating base timing signal frequency. The microprocessor reads the frequency information and adjusts the foreground and background timers to operate at predetermined time intervals.

Referring back to FIG. 11, the foreground timer interval task then senses if one of a plurality of foreground task flags are set, steps 274 through 280. The foreground task flags are set by a corresponding foreground task. For example, in decoding paging information, bit synchronization occurs first. The bit synchronization task then sets the next foreground task flag such as group ID flag. After the group ID task has executed, the group ID task sets the data decoding flag. After the data decoding task executes, the battery saving task is executed until new paging information is detected. Each foreground task flag corresponds to the data sampling rate required by the corresponding foreground task spends performing its task. For example, if the 1.0 millisecond flag is set, this corresponds to the data sampling interval for the paging receiver to synchronize to the incoming paging information. The 2.5 millisecond flag corresponds to the data sampling interval required for decoding the data portion of the incoming paging information. The 5 millisecond flag corresponds to the data sampling interval required for decoding the frame and group ID portion of the paging information. It is important to note that the data decoding is performed at a faster rate since the data transmission of typical paging schemes are performed at a rate faster than the frame or group ID decoding. For instance, in the paging scheme cited, data is transmitted and decoded at 400 bits per second while the frame and group ID are transmitted and decoded at 200 bits per second. The 77.5 millisecond flag corresponds to the battery saving function of the microprocessor. That is, for 77.5 milliseconds, the microprocessor is in a low power wait state after which the microprocessor is placed back in a high computational background process state.

Steps 282 through 288 then add the corresponding time of the scheduled foreground task to the background timer. For example, if the bit synchronization foreground task is scheduled, 1 millisecond is added to the background timer. Correspondingly, 2.5 milliseconds is added for data decoding, 5 milliseconds is added for frame or group ID decoding, and 77.5 milliseconds is added to the background timer for battery saving. It is important to note that the background tasks are scheduled to execute on the average every 77.5 milliseconds. Thus the foreground task time is added to the background timer because the background timer interrupt is disabled during the foreground process. Thus, the foreground process time must be added to the background timer.

The foreground routine then clears the foreground task flags so that they may be set again by the corresponding foreground tasks, step 290. The time for the next interrupt is then computed by adding the next desired foreground timer interrupt value to a timer capture value and storing it in the timer capture value register of the microprocessor. That is, when the timer capture register counts down to a predetermined value such as 0, an interrupt will occur. The foreground timer interval task then exits, step 294.

Referring back to steps 280 and 260, if an error occurs in the processing and a frequency flag is not set or a foreground task is not scheduled, a deadman timer will timeout which forces the microprocessor into a reinitialization state, step 296.

After determining the foreground timer interval, the foreground timer interval task passes control to one of a plurality of scheduled foreground tasks as exemplified by step 218 of FIG. 10. Typical foreground tasks include but are not limited to data/bit sychronization, data detecting and decoding, frame decoding, and battery saving. Each foreground task requires a task time interval to perform its task. For instance, the bit sychronization requires 1 millisecond while the data decoding requires 2.5 milliseconds. It is important to note that the time interval for each task depends upon the particular paging scheme involved. For instance, a different paging scheme may have different time intervals. However, if the foreground task for a different paging scheme executes the same function within the allotted time interval, the timing interval does not have to be modified. For instance, bit synchronization may actually execute in 0.25 milliseconds within the 1.0 millisecond bit synchronization window. As long as the execution time (0.25 milliseconds) is less than the task window (1.0 milliseconds), the time interval (1.0 milliseconds) can remain the same. After the foreground tasks are executed, the microprocessor returns to the wait state in the background process.

Referring to FIG. 12, there is shown a table for the MC68HL05L6 microprocessor for determining the timer interval value as a function of microprocessor clock frequency versus timer interval. For example, at a clock frequency of 2.00 MHz, the 2.5 millisecond timer internal timer is 625 counts. That is, when the internal timer register counts down from 625 operating with a 2.00 MHz clock, 2.5 milliseconds have elapsed. If the clock frequency is changed to 2.016 MHz, the 2.5 millisecond timer interval is 630. When the interval timer register counts down from 630 with a 2.016 MHz clock, 2.5 milliseconds have elapsed. The table illustrates one possible method of maintaining a predetermined time interval (1.0 ms–77.5 ms) while varying the clock frequency of the microprocessor.

Referring to FIG. 13, there is shown a routine for one embodiment of the present invention for a single predetermined receive frequency having a single decoding means clock frequency or base timing signal frequency. One of the objectives of this routine is to provide the clock frequency information to the foreground timer interval task (step 252 of FIG. 11). The task is entered in step 300. The decoding means clock frequency information is read from either a memory or a hardwire configuration, step 302. For instance, the clock frequency information can be stored in the code plug memory of the microcomputer. The same information can also be determined from jumpers hard wired in the paging receiver. After the clock frequency information is determined, the routine sets the appropriate frequency flag, step 304. The routine then exits, step 306.

Figure 14:
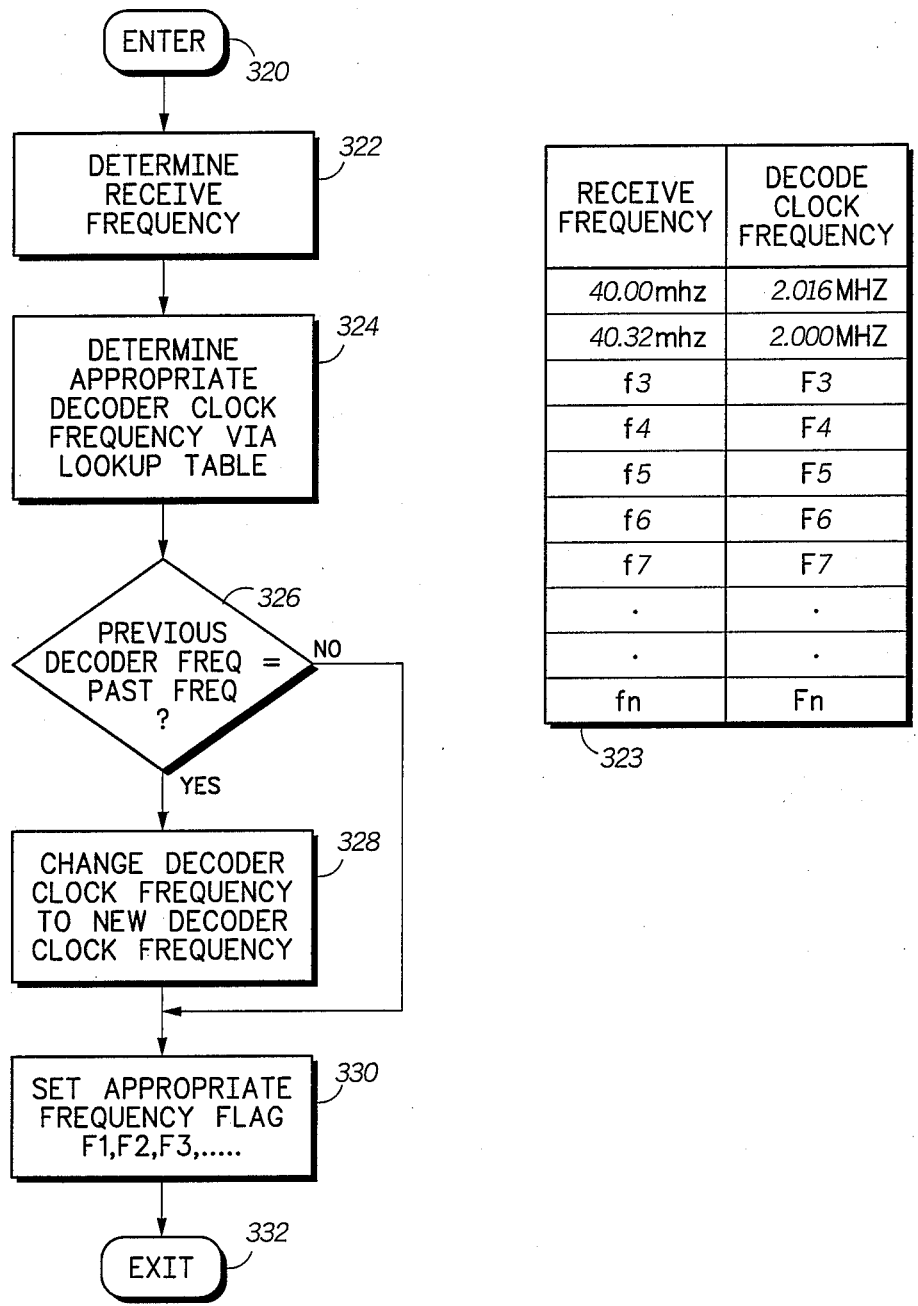
FIG. 14 is a flow chart showing a method for determining the decoding means clock frequency for a paging receiver having a plurality of receiving frequencies.

Referring to FIG. 14, there is shown another embodiment of the present invention of having multiple receive frequencies, each receiver frequency having a corresponding decoder clock frequency. In this particular embodiment, the microprocessor has a plurality of clock frequencies available for operation. The microprocessor clock frequencies are predetermined so as to minimize spurious interference with receiver operation at a corresponding receive frequency. For instance, it has been determined that for a receive frequency of 40 MHz, that a microprocessor clock frequency of 2.016 MHz minimizes spurious interference caused by the interaction between the decoder clock, DC-to-DC oscillator and the receiver. Additionally, it has been determined that at receive frequency of 40.32 MHz, a microprocessor clock frequency of 2.000 MHz minimizes spurious interference caused by the interaction between the decoder clock, DC-to-DC oscillator and the receiver.

The routine is entered in step 320. The receive frequency is determined, step 322. The routine then determines the corresponding microprocessor clock frequency via a look up table 323 in memory in a manner well known in the art, step 324. For instance, if the receive frequency is at 40.36 MHz, the look up table will return a microprocessor clock frequency of 2.000 MHz.

In practice, the microprocessor frequencies can be experimentally determined for a specific type of paging receiver so as not to interfere with receiving means operation at a particular receiver frequency. The routine then determines if the new microprocessor clock frequency is different from th current microprocessor clock frequency, step 326. If the clock frequencies are different, the microprocessor clock frequency is changed to the new clock frequency, step 328. Referring back to step 326, if the clock frequencies are the same, the procedure continues to set the appropriate frequency flag to notify the microprocessor of the frequency of the clock, step 330. The routine then exits, step 332. As is evident, the microprocessor multiple clock frequency routine allows the microprocessor to run at different base frequencies so as not to interfere with receiver operation and to minimize the injection of spurious interference into the paging receiver.

Thus, there has been shown a method and apparatus for minimizing spurious interference signals generating in a paging receiver. The paging receiving system includes a frequency receiving means, a decoding means, a voltage generation means, and a timing means. The receiving means receives coded information from a base station transmitter. The decoding means detects and decodes the received coded information in real time. The voltage generation means provides power to the decoding means and receiving means. The timing means provides timing signals to the decoding means and controls the basic timing signal frequency provided to the decoding means. The timing means frequency is chosen to minimize spurious interference signals interfering with the receiving frequency and/or the intermediate frequency of the receiving means. The decoding means operates at the select base timing frequency and effectively detects and decodes the coded information in real time.

In another form of the invention, the voltage generating means includes a voltage converting means for providing higher voltages and can be provided by the voltage generating means. The timing means includes an oscillator for generating a series of base timing signals and a frequency translation means for generating first timing signals for the decoding means and second timing signals for the voltage converting means. The first and second timing signal frequencies are harmonically related to the base timing signal frequency and are harmonically unrelated to the frequency to the receiving frequency and the intermediate frequency of the receiving means for minimizing spurious signal responses.

While there has been shown and described what was at present considered to be the preferred embodiment of the present invention, modifications thereto will readily occur to those skilled in the art. It is not desired, therefore, that the invention be limited to the specific arrangements shown and described, but it is intended to cover in the appended claims all such modifications as fall within the true spirit and scope of the invention.

What is claimed is:

1. A method for minimizing spurious interference signals generated in a receiver receiving an information signal modulated upon one of a plurality of carrier frequencies, the receiver including
   a frequency receiving means for receiving and demodulation information modulated upon at least one carrier frequency,
   information processing means for processing the demodulated information signal, and
   an oscillator for providing a clock signal for said information processing means, the clock signal having a selectable clock frequency, wherein the spurious interfering signals are generated by said information processing means and are a function of the frequency of the clock signal, said method comprising the steps of:
   (a) determining a clock frequency corresponding to a carrier frequency wherein the spurious interfering signals are reduced;
   (b) determining the carrier frequency of the frequency receiving means; and
   (c) selecting the clock frequency corresponding to the determined carrier frequency.

2. The method of claim 1 wherein said information processing means includes a microprocessor having an operating frequency and a voltage converting means having an operating frequency and providing voltage to the microprocessor wherein the spurious interfering signal are generated by said microprocessor and said voltage converting means, said method further including the step of controlling the operating frequency of the microprocessor and voltage converting means simultaneously with the clock frequency.

3. The method of claim 2 further including the step of operating the voltage converting means at an integer multiple or divisor of the clock frequency.

4. The method of claim 1 wherein said information processing means includes a storage means, and wherein the method of step (c) of selecting further includes the steps of:
   storing the plurality of clock frequencies correspondence to the plurality of carrier frequencies in the storage means; and
   providing the clock frequency corresponding to the determined carrier frequency.

5. The method of claim 1 wherein said information processing means further includes an adjustable timing means responsive to the frequency of the clock signal and further performs a plurality of tasks for processing the information signal, wherein a task is executed at a time derived from said timing means, and wherein said method further includes the steps of:
   operating said information processing means with the selected clock frequency; and
   adjusting the timing means in order to maintain a predetermined task execution timing.

6. The method of claim 5 wherein the plurality of tasks include an incoming signal processing task and a received signal processing task, said method further including the steps of:
   (d) executing the incoming signal processing task on a first predetermined task timing for decoding the demodulated information signal, wherein the incoming signal task operates for a first interval; and
   (e) executing the received signal processing task on the time available between the completion of the first interval and a subsequent execution of the incoming signal processing task.

7. The method of claim 6 wherein step (d) of executing further includes the steps of:
   detecting the demodulated information signal;
   synchronizing to the demodulated information signal;
   decoding the demodulated information signal; and
   storing the demodulated information signal in a memory means.

8. The method of claim 6 wherein step (e) of executing further includes the steps of:
   reading the demodulated stored in a memory means;
   generating an alert in response to the demodulated information; and
   manipulating the demodulated information in response to a command.

9. A method for minimizing spurious interference signals generated in a communication receiver for receiving coded information having a predetermined information rate, the communication receiver including
   a receiving means for receiving the coded information,
   an adjustable timing means for generating timing signals derived from a selectable reference frequency, and
   a decoding means clocked by the selectable reference frequency and responsive to the timing signals, for decoding the coded information, said method comprising the steps of:
   (a) selecting a reference frequency to reduce spurious interference signals generated by the decoding means and received by the receiving means;
   (b) adjusting the frequency of the timing signals to correspond to the predetermined information rate;
   (c) receiving the coded information; and
   (d) decoding the received coded information at a rate provided by the timing signals.

10. The method of claim 9 wherein the receiving means includes at least one predetermined intermediate frequency and wherein step (a) of selecting further includes the step of selecting the reference frequency to minimize spurious interference signals in the intermediate frequency.

11. The method of claim 10 wherein the decoding means includes a microprocessor operating at a first frequency and a voltage converting means for supplying an operating voltage for the microprocessor and operating at a second frequency and wherein step (a) of selecting further includes the steps of:

(e) providing a plurality of timing signals derived from the selectable reference frequency;

(f) generating a first timing signal for operating the microprocessor at the first frequency in response to the base timing signals; and (g) generating a second timing signal for the voltage converting means at the second frequency in response to the base timing signals, wherein the second frequency is harmonically related to the first frequency.

12. The method of claim 11, wherein the step of (f) of generating further includes multiplying the selectable reference frequency for applying a higher frequency first timing signal to the microprocessor.

13. The method of claim 11 wherein step (g) of generating further includes dividing the selectable reference frequency for applying a lower frequency second timing signal to the voltage converting means.

14. The method of claim 11 wherein step (g) of generating further includes multiplying the selectable reference frequency for applying a higher frequency second timing signal to the voltage converting means.

15. The method of claim 9 wherein the decoding means includes a microprocessor having a memory means, said method further including the steps of:

(h) establishing a plurality of timing signal frequencies, each timing signal frequency corresponding to a received frequency signal for reducing spurious signal response; and (i) storing the plurality of timing signal frequencies in the memory means.

16. The method of claim 15 further including the steps of:

(j) operating the timing means at a timing signal frequency corresponding to a received frequency; and (k) providing the timing signal frequency to the microprocessor for permitting the microprocessor to determine its operating frequency to effect the decoding of received coded information at the predetermined information rate.

17. A communication receiver for receiving coded information having an information rate, said communication receiver comprising:

receiving means for receiving and demodulating the coded information;

decoding means having an operating frequency for decoding the received coded information;

voltage generating means, coupled to said decoding means and receiving means, for providing power; and timing means for controlling the operating frequency of said decoding means wherein spurious interference signals include signals originating from the decoding means and interfering with the receiving means are minimized, and wherein the decoding means effectively decodes the coded information at the information rate.

18. The communication receiver system of claim 17 wherein the receiving means receives the coded information modulated upon a receive frequency signal and the receiving means includes an at least one predetermined intermediate signal frequency, and wherein the receiving means has a frequency bandwidth associated with the receive frequency signal and a frequency bandwidth associated with the intermediate frequency signal and wherein the timing means includes:

oscillator for generating a first base timing signal having a frequency and;

frequency translation means for generating a first timing signal having a frequency, and being generated for the decoding means, wherein the first timing signal frequency being harmonically related to the first base timing signal frequency has a minimal amount of harmonic energy falling within the bandwidths of the receiving signal frequency and the intermediate signal frequency.

19. The communication receiver of claim 18 wherein the frequency translation means includes:

a first frequency converting means for generating the first timing signal for the decoding means, wherein the frequency of the first timing signal is harmonically related to the frequency of the base timing signal.

20. The communication receiver of claim 19 wherein the first frequency converting means includes a frequency multiplying means for generating a first timing signal being a multiple of the timing frequency of the base timing signal.

21. The communication receiver of claim 17 wherein the decoding means includes a microprocessor having a memory means, and wherein the timing means is adapted for operating at a plurality of selectable base frequencies, wherein the memory means includes stored values corresponding to the frequency of said timing means for providing said stored values to said microprocessor, whereby said microprocessor maintains an operational timing for effecting a detecting and decoding of the received information.

22. The communication receiver of claim 17 further including a voltage converting means being responsive to said voltage generating means and said timing means for supplying higher voltages to said decoding means.

23. The communication receiver of claim 22 wherein the receiving means includes at least one predetermined intermediate frequency signal and wherein the timing means includes:

oscillator for generating a first and second base timing signal; and frequency translation means for generating a first timing signal from the first base timing signal for the decoding means and for generating a second timing signal from the second base timing signal for the voltage converting means, wherein the first and second timing signal frequencies being harmonically related to the first and second base timing signal frequencies are harmonically unrelated to the receiving signal frequency and the intermediate signal frequency.

24. The communication receiver of claim 23 wherein the frequency translation means includes:

a first frequency converting means for generating the first timing signal to the decoding signal, wherein the frequency of the first timing signal is harmonically related to the frequency of the first base timing signal; and a second frequency diversity means for generating the second timing signal to the voltage converting means, wherein the frequency of the second timing signal is harmonically related to the frequency of the second base timing signal.

25. The communication receiver of claim 24 wherein the second frequency converting means includes a means for dividing the timing frequency of the base timing signal.

26. The communication receiver of claim 24 wherein the second frequency converting means includes a means for multiplying the timing frequency of the base timing signal.

27. The communication receiver of claim 22 wherein the voltage converting means includes a DC to DC converter.

* * * * *